(12) United States Patent
Delcommune

(10) Patent No.: US 10,414,522 B2
(45) Date of Patent: Sep. 17, 2019

(54) FUELLING CONNECTION MODULE FOR SPACE LAUNCH VEHICLE

(71) Applicant: Techspace Aero S.A., Herstal (Milmort) (BE)

(72) Inventor: Julien Delcommune, Chaudfontaine (BE)

(73) Assignee: SAFRAN AERO BOOSTERS SA, Herstal (Milmort) (BE)

(*) Notice: Subject to any disclaimer, the term of this patent is extended or adjusted under 35 U.S.C. 154(b) by 664 days.

(21) Appl. No.: 15/150,511

(22) Filed: May 10, 2016

(65) Prior Publication Data
US 2016/0340063 A1    Nov. 24, 2016

(30) Foreign Application Priority Data

May 18, 2015 (BE) .................................. 2015/5305

(51) Int. Cl.
*F16L 55/00* (2006.01)
*B64G 5/00* (2006.01)
*B64G 1/40* (2006.01)

(52) U.S. Cl.
CPC ................ *B64G 5/00* (2013.01); *F16L 55/00* (2013.01); *B64G 1/401* (2013.01)

(58) Field of Classification Search
CPC ..... F16L 55/00; F16L 55/1007; F16L 29/005; B64G 5/00; B64G 1/401
USPC .......... 285/1–4, 922; 89/1.811, 1.816, 1.819, 89/1.806
See application file for complete search history.

(56) References Cited

U.S. PATENT DOCUMENTS

| | | | | |
|---|---|---|---|---|
| 841,095 A | * | 1/1907 | Osborne | F16K 17/40 137/315.04 |
| 4,039,208 A | * | 8/1977 | Pernet | E21B 7/128 285/123.1 |
| 4,240,462 A | * | 12/1980 | Bankstahl | F16K 27/08 137/315.01 |
| 4,323,094 A | * | 4/1982 | Paulis | B64D 37/16 137/614.03 |

(Continued)

FOREIGN PATENT DOCUMENTS

| FR | 2639610 A1 | 6/1990 |
|---|---|---|
| FR | 2685903 A1 | 7/1993 |
| FR | 2943627 A1 | 10/2010 |

OTHER PUBLICATIONS

Search Report dated Feb. 2, 2016 for BE 201505305.

*Primary Examiner* — Anna M Momper
*Assistant Examiner* — Fannie C Kee
(74) *Attorney, Agent, or Firm* — James E. Walton

(57) ABSTRACT

Connection module for fuelling a space launch vehicle with cryogenic propellant. The module has a ground part placed on the launch pad mast side of the launch vehicle; a flight part fixed to the launch vehicle; a link fixed to the parts to unite them. The module exhibits a passage crossing the ground part, the flight part and the link. The passage allows communication between a line of the launch pad, such as an umbilical structure of the launch vehicle, and a line supplying a tank or a pneumatic circuit of the launch vehicle. Twisting means, such as a lever or an arm, are linked to a disconnection cable. During lift-off, the twisting means apply a torque to the link which causes the breakage of a link groove, allowing the link to split into two axial portions.

10 Claims, 3 Drawing Sheets

(56) References Cited

U.S. PATENT DOCUMENTS

| | | | | |
|---|---|---|---|---|
| 4,479,666 A * | 10/1984 | Welsh | ................... | F16B 31/028 |
| | | | | 285/148.19 |
| 4,553,482 A * | 11/1985 | Weber | ....................... | F42B 8/14 |
| | | | | 102/529 |
| 4,614,201 A * | 9/1986 | King | ...................... | F16K 17/40 |
| | | | | 137/312 |
| 4,991,798 A * | 2/1991 | Landat | ................... | B64G 1/402 |
| | | | | 102/377 |
| 5,507,313 A * | 4/1996 | LeDevehat | ........... | F16L 37/373 |
| | | | | 137/614.05 |
| 8,505,429 B2 * | 8/2013 | Malapel | ................... | B64G 5/00 |
| | | | | 89/1.811 |
| 2008/0099073 A1 * | 5/2008 | Lauber | ................ | B67D 7/3218 |
| | | | | 137/68.14 |

\* cited by examiner

FUELLING CONNECTION MODULE FOR SPACE LAUNCH VEHICLE

This application claims priority under 35 U.S.C. § 119 to Belgium Patent Application No. 2015/5305, filed 18 May 2015, titled "Fuelling Connection Module for Space Launch Vehicle" which is incorporated herein by reference for all purposes.

BACKGROUND

1. Field of the Application

The present application relates to a connection module for fuelling a launch vehicle. More precisely, the present application relates to a connection module for fuelling a launch vehicle having a mechanical connecting element. The present application likewise relates to a method of splitting a connection module connecting element for space launch vehicle fuelling.

2. Description of Related Art

The engine of a space launch vehicle generally uses liquid propellant for its propulsion. This cryogenic fuel is stored in a tank linked to the launch pad facilities up to the point of lift-off. The supply is accomplished with the help of a coupling and disconnection device provided with a plurality of lines through which the fuel, the oxidizer and other fluids, such as control gases, can flow. These links naturally allow, among other things, the filling of tanks, drainage, the supply of control devices, cleaning of the space launch vehicle. In fact, certain aborted launch scenarios require a tank to be drained, as the fuel exhibits an unstable nature.

The link is integral with a ground plate and a flight plate of the device. It is split into two portions which remain hooked either to the ground plate or to the flight plate. Its breaking apart is caused by a mechanism which exerts an axial tensile strength.

Document FR 2639610 A1 discloses a filling device for cryogenic propulsion units of a space launch vehicle, said device becomes separated automatically when the space launch vehicle lifts off. The device comprises an on-board line and a ground line. The ground line comprises a tube exhibiting a weakened zone on which stay rods are supported. When the space launch vehicle lifts off, a sleeve actuates the stay rods towards the tube. They then apply an axial tractive force on the tube, causing the weakened zone to break. The tube is split into two parts, each remaining integral with the ground portion or the on-board portion of the device. A device of this kind allows the space launch vehicle to be filled right up to the last moment before lift-off. However, the reliability of the break remains limited, despite a complex mechanism.

Although great strides have been made in the area of fuelling connection modules for space launch vehicles, many shortcomings remain.

DETAILED DESCRIPTION OF THE PREFERRED EMBODIMENT

Figure 1:
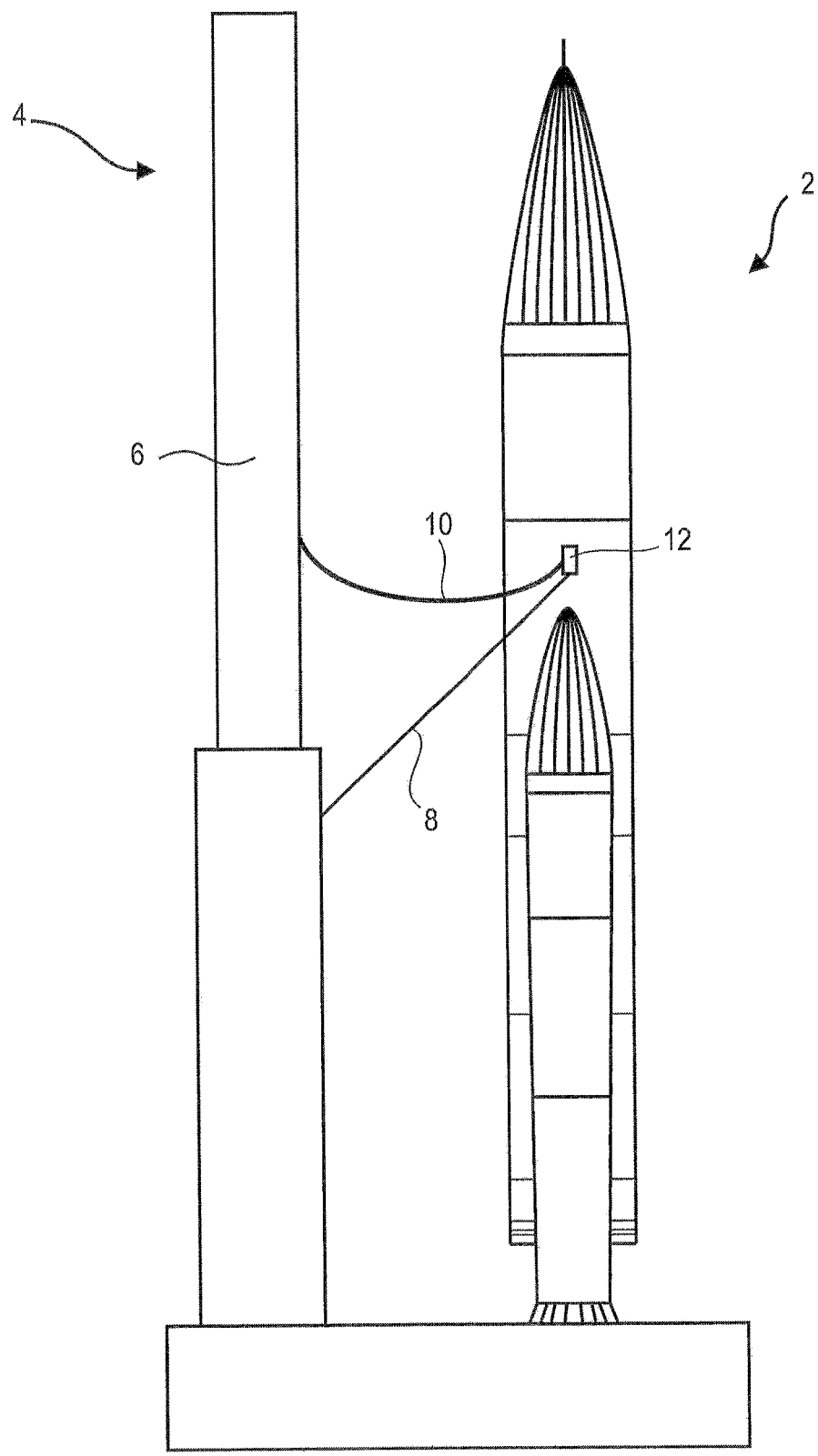
FIG. 1 shows represents a launch base of a launch vehicle according to the present application.

The present application aims to solve at least one of the problems raised by the prior art. More precisely, the aim of the present application is to improve the reliability of a connection module for fuelling a space launch vehicle. Likewise, the aim of the present application is to reduce the cost of a connection module for fuelling.

It will be clear that one aim of the present application is a high-pressure hydraulic connection link, particularly a connection link between the ground part and the on-board part of a connection module for space launch vehicle fuelling, said link comprising three portions, a second portion whereof is linked to the first portion and to the third portion with the help of a first joint attached to the first portion and with the help of a second joint attached to the third portion.

According to an advantageous embodiment of the present application, the first portion and/or the second portion comprises an outer surface with designs configured to transmit an axial torsion torque to the link, each outer surface possibly being hexagonal.

According to an advantageous embodiment of the present application, the first joint is a circular groove and/or a predetermined breaking point, for example with an axial length of less than 10.00 mm, preferably less than or equal to 5.00 mm.

According to an advantageous embodiment of the present application, the first joint comprises at least one shoulder and/or the second joint comprises at least one zone with a progressive variation in diameter.

According to an advantageous embodiment of the present application, the second joint is at least three times longer axially than the first joint, preferably at least ten times longer, more preferably at least twenty times longer.

According to an advantageous embodiment of the present application, the link is a conduit.

According to an advantageous embodiment of the present application, the link is adapted to withstand cryogenic conditions.

According to an advantageous embodiment of the present application, the link is formed by an annular wall which is less thick at the second joint than at the first joint.

According to an advantageous embodiment of the present application, the third portion comprises tightening means, particularly a screw thread.

According to an advantageous embodiment of the present application, the link is one-piece and possibly integrally formed.

One aim of the present application is likewise a connection module, in particular for fuelling a space launch vehicle, said module comprising: a ground part intended to be linked to one or a plurality of launch pad lines of the launch vehicle; a flight part intended to be placed between the ground part and the launch vehicle, the ground and flight parts possibly comprising corresponding supply means; at least one link which is extended following an axis and which is attached to the parts in such a manner as to unite them, at least axially; it is remarkable in that it further comprises means of twisting the link which are adapted to allow a breaking torque to be applied to the link along its axis, in such a manner as to separate the link and be able to release the flight part from the ground part.

According to an advantageous embodiment of the present application, the twisting means comprise a disconnection lever which extends perpendicularly in respect of the link and which is intended to be held by a disconnection cable.

According to an advantageous embodiment of the present application, the link comprises a first joint forming a predetermined breaking point, particularly a first joint forming a narrowing.

According to an advantageous embodiment of the present application, the predetermined breaking point comprises a circular link groove, possibly about the link.

According to an advantageous embodiment of the present application, the link exhibits two halves along its length, the predetermined breaking point and the twisting means being disposed on the same half of the link.

According to an advantageous embodiment of the present application, the predetermined breaking point begins at the outer surface of the flight part, the twisting means possibly being level with the predetermined breaking point axially.

According to an advantageous embodiment of the present application, the link is solid.

According to an advantageous embodiment of the present application, the link comprises a conduit; the module preferably comprises a passage crossing the flight part, the ground part and the conduit.

According to an advantageous embodiment of the present application, the link comprises a wall surrounding the passage.

According to an advantageous embodiment of the present application, the joint comprises a second joint forming a zone of reduced thickness, possibly on the wall.

According to an advantageous embodiment of the present application, the second joint is profiled axially and is possibly annular, particularly tubular, its ends possibly comprising connecting radii.

According to an advantageous embodiment of the present application, the second joint extends axially over most of the thickness of the ground part; it possibly forms the main part of the link axially.

According to an advantageous embodiment of the present application, the first joint comprises a minimal moment of inertia which is greater than the minimal moment of inertia of the second joint.

According to an advantageous embodiment of the present application, the ground part comprises a remote support surface, against which the link is supported, possibly via fixing means.

According to an advantageous embodiment of the present application, axially at the twisting means the link comprises an outer surface with designs configured to transmit the breaking torque from the twisting means to the link.

According to an advantageous embodiment of the present application, the link comprises two opposite ends, one with possibly reversible tightening means, the other with an axial stop.

According to an advantageous embodiment of the present application, the parts each comprise an opening crossed by the link.

According to an advantageous embodiment of the present application, the parts define a chamber occupied by the twisting means.

According to an advantageous embodiment of the present application, the link is a functional link with a particularly cryogenic temperature and/or the module is a cryogenic module; it is adapted to temperatures lower than −100° C., preferably lower than or equal to −200° C.

According to an advantageous embodiment of the present application, the link is shared by the parts in such a manner as to fix the ground part and the flight part one in respect of the other and/or form a conduit crossing the module.

According to an advantageous embodiment of the present application, the passage is straight and/or has a variable cross section.

According to an advantageous embodiment of the present application, the predetermined breaking point and twisting means are disposed on the same axial third or on the same axial quarter of the link.

According to an advantageous embodiment of the present application, the second joint extends over at least 10% of the length of the joint, preferably over at least 25% of the length of the link, more preferably over at least 50% of the length of the link.

According to an advantageous embodiment of the present application, the link and the twisting means each comprise a bearing structure hexagonal to their interface.

One object of the present application is likewise a connection module for fuelling a launch vehicle, particularly a space launch vehicle propulsion unit, the module comprising: an flight part intended to be fixed to the launch vehicle; a ground part intended to be placed at a distance from the launch vehicle; a link which is attached to the parts in such a manner as to unite them; a passage crossing the ground part, the flight part and the link and which is designed to allow communication between a line of the launch vehicle and a line of the launch pad, such as an umbilical structure; it is remarkable in that the link comprises tightening means configured to press the ground part and the flight part one against the other and to stress the link mechanically.

According to an advantageous embodiment of the present application, the mechanical stress is an axial tensile stress.

One object of the present application is likewise a connection module separation method for fuelling a launch vehicle during lift-off, said module comprising: a flight part fixed to the launch vehicle; a ground part opposite the flight part on the launch vehicle, the ground and flight parts possibly comprising corresponding supply means, a link which extends along an axis and which is attached to the parts in such a manner as to unite them; during separation of the connection module, the link is broken in such a manner as to be able to release the flight part from the ground part; it is remarkable in that during separation of the connection module, the link is broken by axial stress, particularly by applying a twisting torque to it, generating shear stress until it breaks.

According to an advantageous embodiment of the present application, during separation the link is twisted along its axis with the help of twisting means, notably a lever, said means being pivoted in relation to the axis of the link during the separation.

According to an advantageous embodiment of the present application, the link is split along a plane preferably perpendicular to the axis, during separation the material of the link is sheared in the plane of separation and possibly in a direction circumferential to the axis.

According to an advantageous embodiment of the present application, the link comprises parts and a first axial joint exhibiting a smaller linear density and/or a smaller torsional stiffness; during separation the breaking torque produces a concentration of stresses at said first joint in such a manner as to break it.

According to an advantageous embodiment of the present application, prior to the separation of the connection module, the link is kept in a mechanically prestressed state.

According to an advantageous embodiment of the present application, prestressing is an axial tensile stress configured to press the parts one against the other with the help of the link.

According to an advantageous embodiment of the present application, the link comprises parts and a second axial joint which exhibits a smaller axial rigidity and which is possibly profiled axially, the tensile stress being greater than 5% of the elastic limit of the material of the second joint, preferably greater than 25%, possibly lying between 60% and 95% of the elastic limit.

According to an advantageous embodiment of the present application, the link comprises at least one joint of reduced thickness; the prestressing brings about a lengthening of the link, said link lengthening principally at the joint of reduced thickness axially.

According to an advantageous embodiment of the present application, the link is a conduit with an annular wall on which is possibly formed the joint with reduced thickness.

According to an advantageous embodiment of the present application, the joint with reduced thickness is a second joint; the link moreover comprising a first joint of reduced thickness, the thickness whereof is greater than that of the second joint, the lengthening being predominantly at the second joint, preferably by more than 80%.

According to an advantageous embodiment of the present application, the link comprises a conduit; the module preferably comprises a passage crossing the flight part, the ground part and the conduit.

According to an advantageous embodiment of the present application, upon separation of the connection module, the link is broken primarily by axial twisting, a remaining minority of the link being broken by wrenching, particularly by traction. This can be guaranteed by springs and/or ejectors.

According to an advantageous embodiment of the present application, twisting brings about a breakage of more than 80% of the link, preferably at least 95%; the remaining 20%, at most, preferably the remaining 5%, at most, being broken by wrenching, particularly by traction.

One object of the present application is likewise an assembly method for a connection module for fuelling a launch vehicle, said module comprising: a ground part on the launch pad side of the launch vehicle, said ground part comprising a ground opening; a flight part integral with the launch vehicle, said flight part comprising a flight opening; a link that is attached to the parts in such a manner as to unite them; it is notable in that during assembly the link is fitted with pretensile stress in such a manner as to press the ground part and the flight part one against the other.

According to an advantageous embodiment of the present application, during assembly the link is inserted in the flight opening and in the ground opening.

According to an advantageous embodiment of the present application, the module comprises sealing means between the flight part and the ground part; when the link is subjected to stress, the sealing means are compressed and are possibly flattened axially.

According to an advantageous embodiment of the present application, the method comprises an adjustment stage and/or a control stage of the tensile stress on the link.

In general terms, the advantageous embodiments of each object of the present application are likewise applicable to the other objects of the present application. Insofar as it is possible, each object of the present application can be combined with other objects of the present application. The methods may be incorporated in procedures, for example an assembly procedure and/or a separation procedure for the connection module during the launch of the launch vehicle.

The module according to the present application offers the utmost separation reliability. In effect, it relies on a smaller number of elements, just like the number of moving parts. An actuator can be dispensed with, since the elevation of the launch vehicle itself acts on the lever, thanks to the cable, and causes the link to break.

Since the link forms the high-pressure line while retaining material continuity from one plate to the other and from one face of the module to the other, the tightness is optimal. The link is severed flush with the flight plate, so that it remains level with its outer surface. Hence, the protruding aspect of the flight portion of the link is limited, which preserves the aerodynamic properties and prevents any launch pad equipment from clinging onto it.

The second portion of the link or flexible portion guarantees a plurality of functions. It keeps the plates pressed one against the other and allows elastic deformation of part of the link. It benefits the seal between the linked passages of the module and can simplify their design.

The module allows a fluid and/or mechanical and/or electrical connection to be maintained up until the start of lift-off, in other words in positive time. In the event of an aborted lift-off, the plates remain connected and in fluidic communication.

The present application allows a tensile stress and a torsional stress to be combined at the link. It creates a synergy, so that the stress leading to breakage of the link can be achieved more easily. This result is allowed thanks to dedicated joints which react in a specific manner to each of these stresses.

FIG. 1 represents in simplified form a space launch vehicle 2 ready to lift off on its launch pad 4 or launch base.

The launch pad 4 optionally comprises a vertical mast 6. A series of cables 8 and a plurality of umbilical supply structures 10 link the launch vehicle 2 to the mast 6. The umbilical structures 10 form lines allowing the propellant tanks of the launch vehicle 2 to be filled until lift-off is imminent. The umbilical supply structures 10 and the cables 8 are connected to the launch vehicle 2 by means of one or a plurality of connection modules 12 allowing automatic connection then disconnection. The connected state is managed independently and is a function of the kinematics of the launch vehicle 2.

A module 12 of this kind allows the launch vehicle 2 to be connected to the mast 6, allowing fluidic communication. The connection remains effective up to the point of lift-off and possibly when the space launch vehicle 2 starts to gain height. The connection ceases when the launch vehicle 2 rises beyond a certain value, for example when the altitude of the launch vehicle reaches a threshold value S1. A disconnection cable 8 linked to the mast and to the module can trigger the disconnection, the division of the module 12 into two parts.

Figure 2:
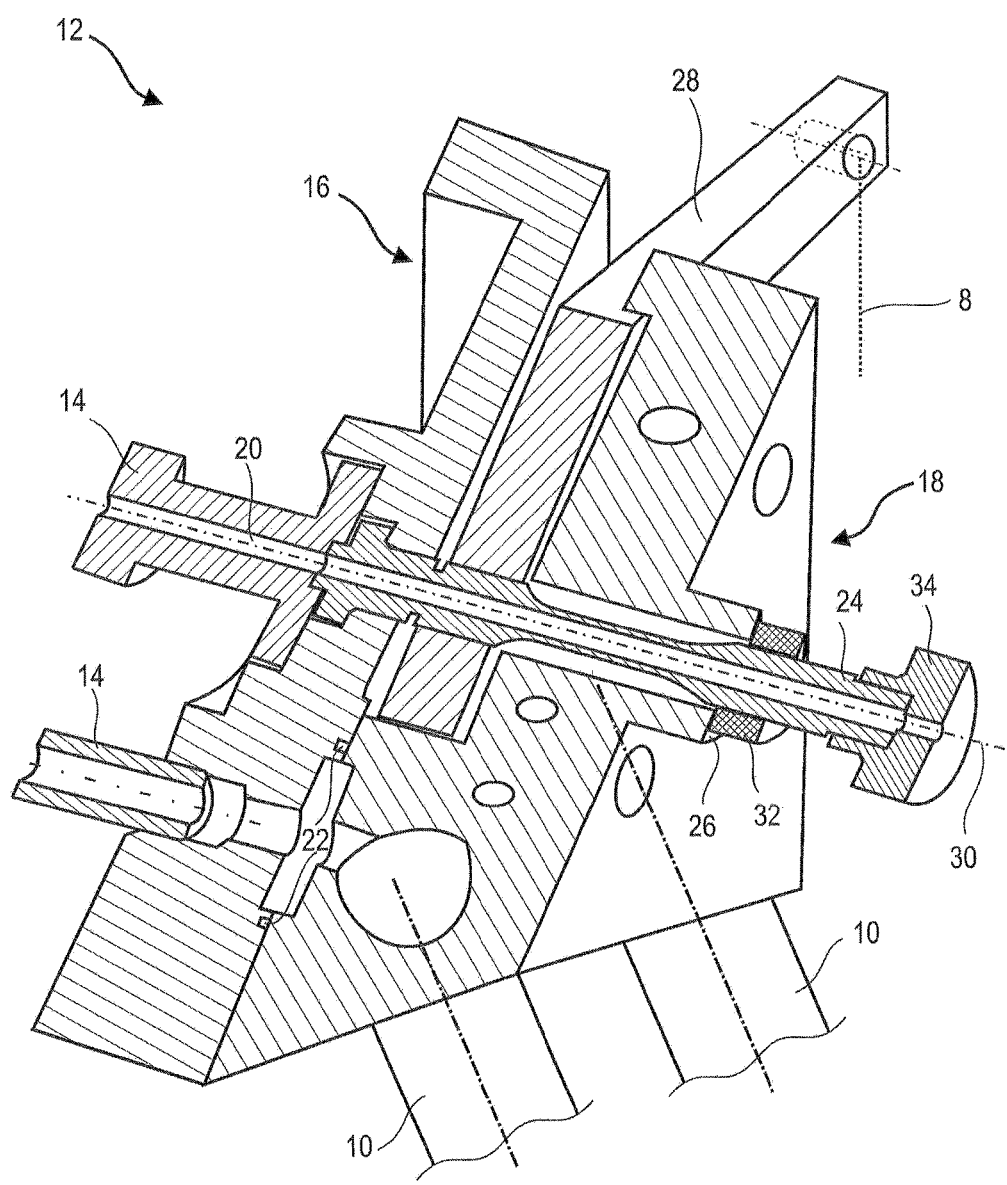
FIG. 2 illustrates a connection module for launch vehicle fuelling according to the present application.

FIG. 2 depicts a sectional view of a connection module 12 for the fuelling of a launch vehicle such as the one in FIG. 1. Conduits 14 of the launch vehicle and umbilical structures 10 are shown connected to the module 12. The disconnection cable 8 is represented by a dotted line.

The module 12 is made up of two parts, one being a flight part 16 and one a ground part 18. Each part is an element, an entity. The parts (16; 18) are pressed one against the other. The ground part 18 is on the side of the umbilical structures 10 and is joined thereto. The ground part 18 is turned towards the outside of the launch vehicle. The flight part 16 is fixed on board the launch vehicle. It remains on board following lift-off. It is connected to the conduits 14 of the launch vehicle, which allow the launch vehicle tank(s) to be filled and/or drained, for example.

The parts (16; 18) may be plates, each exhibiting a face turned towards the opposite part. The parts (16; 18) allow the fixing of various connections, in other words the connection of supplies. They may generally be boards, forming bodies, the thickness whereof is crossed by passages which may be bent. The parts (16; 18) are fixed one to the other, they further represent means of absorbing shear stresses at their interface. For example, keys (not shown) engaged in corresponding slots allow this function to be fulfilled.

The ground and flight parts possibly comprise corresponding supply means. For example, an opening may connect to another means such as a plug, an opening, a connector or any other means. The module allows the connection of at least one fluid passage 20, preferably of a plurality of fluid passages 20, from one part to the other. Each passage 20 communicates with a ground line 10, such as one of the umbilical structures 10; the link 24 may possibly be or comprise a conduit allowing a totally optional passage 20 according to the present application. Each passage 20 generally crosses the connection module and, in particular, each part (16; 18). A passage 20 possibly links two different faces of one of the parts 18. At the interface between the parts, the module may comprises seals 22, such as O-rings.

The parts (16; 18) of the module 12 are connected, preferably fixed one to the other, thanks to a link 24 possibly forming a passage 20 of the module 12. The link 24 may comprise fixing means, such as possibly reversible tightening means and/or a stop surface such as a shoulder. The fixing means may each cooperate with one of the parts (16; 18), particularly by resting thereon. In particular, the flight part 16 may comprise a supporting surface housed in its thickness and the ground part 18 may exhibit a supporting surface 26 offset towards the outside. This surface 26 may be remote from the general casing of the ground part 18. This offset allows the link 24 to be lengthened axially, which has the advantage of increasing its elasticity and flexibility.

In order to bring about the breakage of the link 24, the module 12 comprises means of twisting 28 the link 24. The twisting means 28 must be integral with the link 24, particularly in rotation, for example thanks to corresponding surfaces. These surfaces may be conjoined one to the other. The twisting means 28 may be connected to the disconnection cable 8. A cable guide (not shown) may be provided so as to guide the stress of the cable 8 on the disconnection means in a predetermined direction.

These twisting means 28 allow a torque to be applied along the lengthening axis 30 of the link 24, for example its central axis and/or its main axis. The twisting means 28 aim to make two portions of the link pivot one in respect of the other following the axis. The disconnection cable 8 tends to limit the height of a point of the twisting means 28 by holding it downwards. Hence, the elevation of the launch vehicle combined with a holding-back of the twisting means 28 leads to an axial twisting of the link 24 until it breaks.

The twisting means may comprise a disc on which the cable is wound and/or a gear system. A pinion may be formed about the link. The pinion may be driven by the disconnection cable or any actuator, such as an engine. The twisting means 28 may be a lever 28, possibly with an end connected to the link 24 in such a manner as to rotate it. The other end of the link is connected to the disconnection cable 8. During lift-off, the lever 28 tends to swing, applying a torque which causes the breakage of the link 24. Said link is divided, split, in response to an internal pivoting, a twisting. Its material is subject to shear stresses greater than its mechanical resistance, possibly affected by the cryogenic conditions. Since the link 24 guarantees or is involved in the cohesion of the parts (16; 18) of the connection module, the breakage thereof allows the disconnection of the module and, in particular, the separation of the parts (16; 18). One 18 remains linked to the launch pad, possibly falling away; the other 16 accompanies the launch vehicle. Valves (not shown) may allow automatic, possibly simultaneous, closure of the ground and flight lines (10; 14).

During assembly of the connection module 12, the parts (16; 18) are pressed one against the other. They exhibit through-openings which are aligned and through which the link 24 is introduced. The link 24 may generally cross the module 12. It is then tightened to immobilize it, in such a manner that it forms an integral assembly with the parts (16; 18) and twisting means 28. During assembly, the link 24 may be exposed to and remain under tensile stress, in such a manner as to keep the parts (16; 18) pressed one against the other with an application force. This prestressing limits the variations in stress to which it is subject and maintains contact between the parts (16; 18), despite the separation stress to which the parts are exposed, such as vibrations, the weight of the umbilical lines and the internal pressure, for example. The seals 22 to which the parts contribute are preserved. The link 24 may be fixed and stressed with the help of a tightened nut 32 and a lock nut to hold the latter. At the free end on the ground side, the link 24 may comprise a connection 34, possibly with another lock nut.

The link 24 is itself able to ensure the fixing of the parts (16; 18) to one another, as well as the pressing thereof. However, other fixings, possibly auxiliary fixings, may be provided. According to the present application, the connection module 12 may comprise a plurality of links 24, allowing the parts (16; 18) to be fixed one to the other; different passages 20 may cross the module 12 there. It is likewise envisaged that the twisting means 28 act on each fixing and/or on each link 24 of the parts (16; 18). The twisting means 28 may include different units dedicated to each fixing and/or to each link between the parts.

Figure 3:
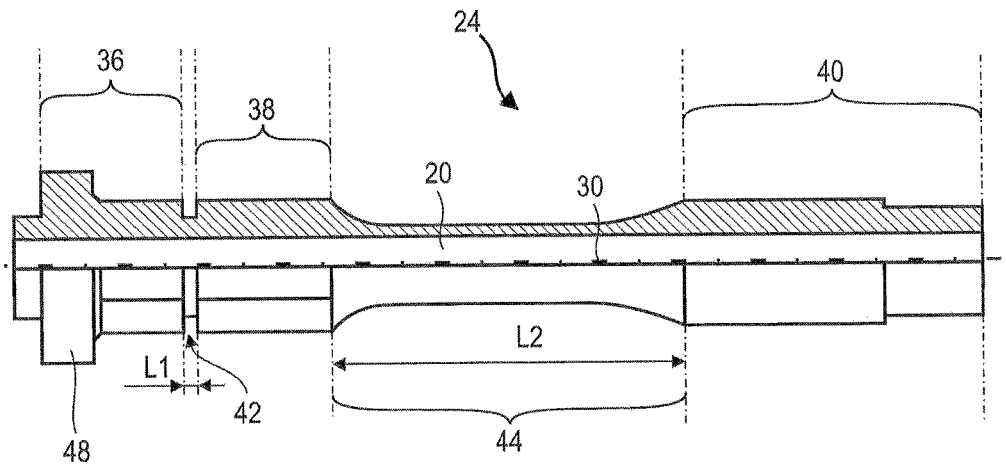
FIG. 3 depicts a connection module link for fuelling according to the present application.

FIG. 3 depicts the link 24 of the connection module for fuelling. An upper half is depicted in section; the other is illustrated laterally. The axis 30 of the link separates these halves.

The link 24 generally forms a measuring tube with a constricted, narrowed zone. A passage 20 may cross right through the link 24 and exhibit a constant diameter. The link 24 comprises a wall which surrounds the axis 30, the thickness whereof varies, possibly axially and/or according to the circumference. It is advantageously realized in metal and is preferably made from a single piece and/or formed integrally. These characteristics are aimed at guaranteeing its mechanical resistance, both static and dynamic, as well as its seal, despite the possible presence of aggressive fluids. The metal may be a super-alloy comprising nickel and chrome, for example, to promote greater resilience in cryogenic conditions. Hence, the breaking of the link 24 is controlled both cryogenically, at ambient temperature, or in hot conditions during the launch. The person skilled in the art is encouraged to develop materials adapted to this use.

The link 24 comprises at least two portions, preferably at least three portions (36; 38; 40). The portions (36; 38; 40) are in contact and/or cooperate with the twisting means and/or at least one or each portion. These portions (36; 38; 40) may be main portions, for example "main" according to the width measured transversely to the axis 30.

From left to right in the figure, a first portion 36, a second portion 38 and a third portion 40 can be seen. These portions (36; 38; 40) are linked with the help of at least one joint (42;

44), preferably a plurality of joints (42; 44). The second portion 38 is linked to the first portion 36 via the first joint 42 and is linked to the third portion 40 thanks to the second joint 44. The joints (42; 44) may mark reductions in width and/or diameter on the link 24.

Advantageously, the first joint 42 is a weakened zone, such as a link zone. It may be a predetermined breaking point, such as a localized notch, or a circular groove. Its axial length L1 is less than 10% of the length of the link. The more its length L1 is reduced, the more the shear stress is concentrated in the event of twisting, thereby allowing the breaking threshold to be reached more quickly. The first joint 42 may comprise at least one shoulder, preferably two, which increase the concentration of stresses. The radial depth of the first joint 42 is greater than 1.00 mm, preferably greater than or equal to 2.00 mm, possibly greater than or equal to 5 mm. The bottom of the groove may have a circular or V-shaped or pointed bottom, the acute aspect whereof amplifies the stress concentration. The second joint 44 comprises at least one, preferably two, zones with progressive changes in diameter which possibly form connection radii. The axial length L2 of the second joint 44 may be at least twenty times longer than the first joint 42. At the second joint 44, the wall of the link 24 is thinner than at the first joint 42. These features come together to make the first joint 42 more rigid in twisting and to make the second joint 44 more flexible. Hence, the place where the breakage occurs when the link is twisted is precisely located. It is easier to divide the link 24 at the first joint 42 flush with the flight part. The first joint comprises a section with a minimal moment of inertia or polar moment of inertia which is weakest for the first joint. The second joint comprises a section with a minimal moment of inertia which is weakest for the second joint. The first moment of inertia is greater than the second moment of inertia. The moments of inertia are according to the axis 30 and/or expressed according to the corresponding section centre.

The third portion 40 comprises tightening means and possibly flat sections. It may comprise a generally tubular bearing structure with a thread pitch. Said thread pitch guarantees at least two functions, namely the control and adjustment of the axial prestress on the link 24 during assembly of the module and the connecting of a ground line linked to the mast. Unlike the third portion 40, the first portion 36 may exhibit or be lengthened by an axial stop such as an annular shoulder 48, which allows axial stoppage.

Figure 4:
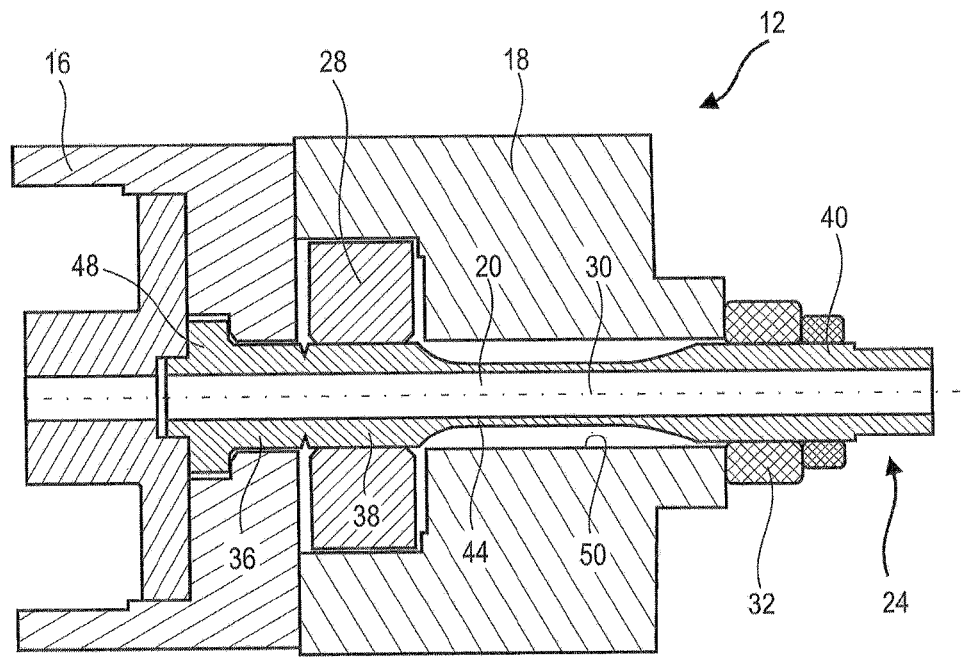
FIG. 4 shows a connection module portion for fuelling according to the present application.

FIG. 4 represents a portion of the connection module 12 centred centered on the link 24.

The outer surfaces of the first portion 36 and of the second portion 38 of the link may be in radial contact with the flight part 16 and twisting means 28, respectively. These outer surfaces may comprise axial and/or radial stopping surfaces. The second joint 44 may be separated from the internal surface 50 of the opening of the ground part 18, releasing a possible movement between the third portion 40 and the ground part 18. There may be mechanical play between the internal surface 50 of the opening of the ground part 18 and the third portion 40, although said third portion may be substantially linked to the ground part by means of the nut 32. The friction between the internal surface 50 and the link 24 is reduced and the adjustment and control of the tensile stress of the link is more precise.

The first portion 36 and/or the second portion 38 each comprise an outer surface with designs. These designs allow locking to prevent rotation about the axis 30, which allows a torque to be applied to one of them, in this case to the second portion 38, while retaining the first portion 36 in the flight part 16 which forms an anchoring zone. The axial torque is applied to the second portion 38 thanks to the twisting means 28 and guided via the outer surface.

During the tightening of the link 24, the ground 18 and flight 16 parts of the module 12 are pressed one against the other, between the nut 32 and the shoulder 48. In parallel, the link 24 is lengthened, for the most part at the second joint 44, by reason of its reduction. The link 24 becomes a spring, in particular its second joint 44, which pulls the parts (16; 18) towards one another.

I claim:

1. A connection module, comprising:
    a ground part intended to be linked to one or a plurality of launch pad lines of the launch vehicle;
    a flight part intended to be placed between the ground part and the launch vehicle, the ground and flight parts comprising:
    corresponding supply means;
    at least one link extending along an axis and which is attached to the parts in such a manner as to unite them, at least axially, wherein the at least one link comprises a conduit for a fluid; and
    an actuator for twisting the at least one link along its axis and for applying a breaking torque to the at least one link along its axis in such a manner as to break apart the at least one link and therefore release the flight part from the ground part.

2. The connection module in accordance with claim 1, wherein the actuator comprises:
    a disconnection lever which extends perpendicularly with respect to the axis of the at least one link and which is configured to be actuated by a disconnection cable.

3. The connection module in accordance with claim 1, wherein the at least one link comprises:
    a first breaking point in the form of a circular groove.

4. The connection module in accordance with claim 3, wherein the circular groove begins at an outer surface of the flight part, and the actuator is positioned at an axial position close to an axial position of the circular groove.

5. The connection module in accordance with claim 3, wherein the at least one link comprises:
    a second breaking point in the form of a zone of reduced thickness.

6. The connection module in accordance with claim 5, wherein the second breaking point extends axially over most more than half of a thickness of the ground part.

7. The connection module in accordance with claim 5, wherein the first breaking point and the second breaking point comprise respective minimal moments of inertia and the minimal moment of inertia of the first breaking point is greater than the minimal moment of inertia of the second breaking point.

8. The connection module in accordance with claim 1, further comprising:
    a passage for a fluid extending through the flight part, the ground part, and the conduit.

9. The connection module in accordance with claim 1, wherein the at least one link, axially aligned with the actuator, comprises:
    an outer surface structured to transmit the breaking torque from the actuator to the at least one link.

10. The connection module in accordance with claim 1, wherein the at least one link comprises:
    two opposite ends, one with reversible tightening means, the other with an axial stop.

* * * * *